Feb. 4, 1964 B. G. V. PETTERSSON 3,120,604

MULTIPLYING APPARATUS

Filed March 27, 1961 7 Sheets-Sheet 2

Feb. 4, 1964 B. G. V. PETTERSSON 3,120,604

MULTIPLYING APPARATUS

Filed March 27, 1961 7 Sheets-Sheet 4

Feb. 4, 1964 B. G. V. PETTERSSON 3,120,604

MULTIPLYING APPARATUS

Filed March 27, 1961 7 Sheets-Sheet 6

| | | | | | | | | S2 |
|---|---|---|---|---|---|---|---|---|
| – | – | – | – | $b_1$ $a_4$ | $b_1$ $a_3$ | $b_1$ $a_2$ | $b_1$ $a_1$ | 1 |
| – | – | – | $b_2$ $a_4$ | $b_2$ $a_3$ | $b_2$ $a_2$ | $b_2$ $a_1$ | – | 2 |
| – | – | $b_3$ $a_4$ | $b_3$ $a_3$ | $b_3$ $a_2$ | $b_3$ $a_1$ | – | – | 3 |
| – | $b_4$ $a_4$ | $b_4$ $a_3$ | $b_4$ $a_2$ | $b_4$ $a_1$ | – | – | – | 4 |
| $c_8$ | $c_7$ | $c_6$ | $c_5$ | $c_4$ | $c_3$ | $c_2$ | $c_1$ | |
| 4 | 3 | 2 | 1 | 4 | 3 | 2 | 1 | S1 |
| 1 | 1 | 1 | 1 | 0 | 0 | 0 | 0 | B |

Fig. 7

Feb. 4, 1964 B. G. V. PETTERSSON 3,120,604

MULTIPLYING APPARATUS

Filed March 27, 1961 7 Sheets-Sheet 7

3,120,604
Patented Feb. 4, 1964

3,120,604

MULTIPLYING APPARATUS

Bror Gustav Valdemar Pettersson, 16 Kumle Alle, Trollbacken, Sweden

Filed Mar. 27, 1961, Ser. No. 98,609
Claims priority, application Sweden Apr. 5, 1960
11 Claims. (Cl. 235—159)

The invention relates to an improved method and an apparatus for multiplying two plural decimal numbers together utilizing a binary system to control internal operation of the system with a decimal counter operated in parallel in such a manner that the product is obtained digit after digit beginning at the lowest order digit in the result.

The method of multiplication according to the present invention is simpler than earlier known methods for multiplication of decimal numbers due to the fact that one of the factors to be multiplied, the multiplicand, is stored in the apparatus in a binary coded decimal form, that is to say each decimal digit of the number is represented by a binary number with four digits, while the multiplier is used only in a coincidence circuit and may thus be regarded as being in a decimal form. A multiplication of two binary numbers in a computer is a considerably simpler procedure than a direct multiplication of two decimal numbers due to the fact that the "multiplication table" for binary digits is only two rows by two columns, as compared with ten rows times ten columns for decimal digits. A multiplication according to the binary system in such a way as is used in a binary computer leads always to difficulties where conversion of the binary product in the binary system into decimal form is required.

To eliminate these difficulties, the product or result, according to the present invention, is obtained directly in decimal form by operation of a decimal counter in parallel to the execution of the operations in the binary form, with the result in decimal from being produced digit by digit beginning with the lowest order or denomination in the product. For practical purposes, it also is sufficient to have an intermediate storage register of four digits, hereinafter referred to as the decimal counter, for the partial result, which is transferred digit by digit beginning with the lowest order digit to a resultant decimal indicating device.

It is a major object of this invention to provide an improved multiplying method and apparatus whereby a binary counter is used to control the multiplying operation internally of the system and a decimal counter is operated simultaneously to proivde a decimal output directly.

Another object is to provide a novel method of multiplying two plural digit decimal numbers together by multiplying each digit of each number with each digit of the other number in a sequence whereby the digits in the product are produced sequentially beginning with the lowest order first, with the final value of each product digit being produced before any operation producing a higher order digit is initiated.

A further object is to provide a novel circuit arrangement for multiplying two decimal digits together which requires only one of the decimal digits to be coded into a four order binary notation and utilizes a seven stage binary counter having its output connected to a diode matrix for indicating coincidence with the decimal digit of the other number.

A still further object is to provide with a circuit arrangement mentioned in the preceding paragraph, a novel sequencing circuit composed of shift registers for multiplying plural digit numbers together and for keeping a running total of the counts from the binary counter required to indicate coincidences in a decimal counter to produce a direct decimal indication of the product. The decimal counter is provided with feed points at different orders and by correlating the feed point used in the decimal counter with the sum of the orders of the individual decimal digit in the multiplicand and in the multiplier being multiplied together, the output of the decimal counter may indicate directly the product of the two numbers in decimal form.

A further object of the invention is to provide a novel sequencing circuit which includes a circuit for detecting a zero in either of the two factors being multiplied together, and for advancing the sequencing circuits in response to the detection of a coincidence indicating the partial product of two non-zero factors has been determined or to the detection of a zero from said zero detecting circuit.

These and other objects of the invention will become more fully apparent from the claims, and from the description as it proceeds in connection with the drawings wherein:

FIGURE 7 is a table illustrating the manner by which multiplication is carried out in accordance with the present invention.

The method of multiplying in accordance with the present invention will be illustrated in a device for weighing and automatically labeling merchandise sold by weight. The total price of the merchandise is computed by the multiplying apparatus of this invention from a price per unit weight for the merchandise and from the weight of the merchandise. The price per unit weight of the merchandise, which will be referred to as the multiplicand, may be entered by any suitable device such as, for example a keyboard, into register M.

Figure 1:
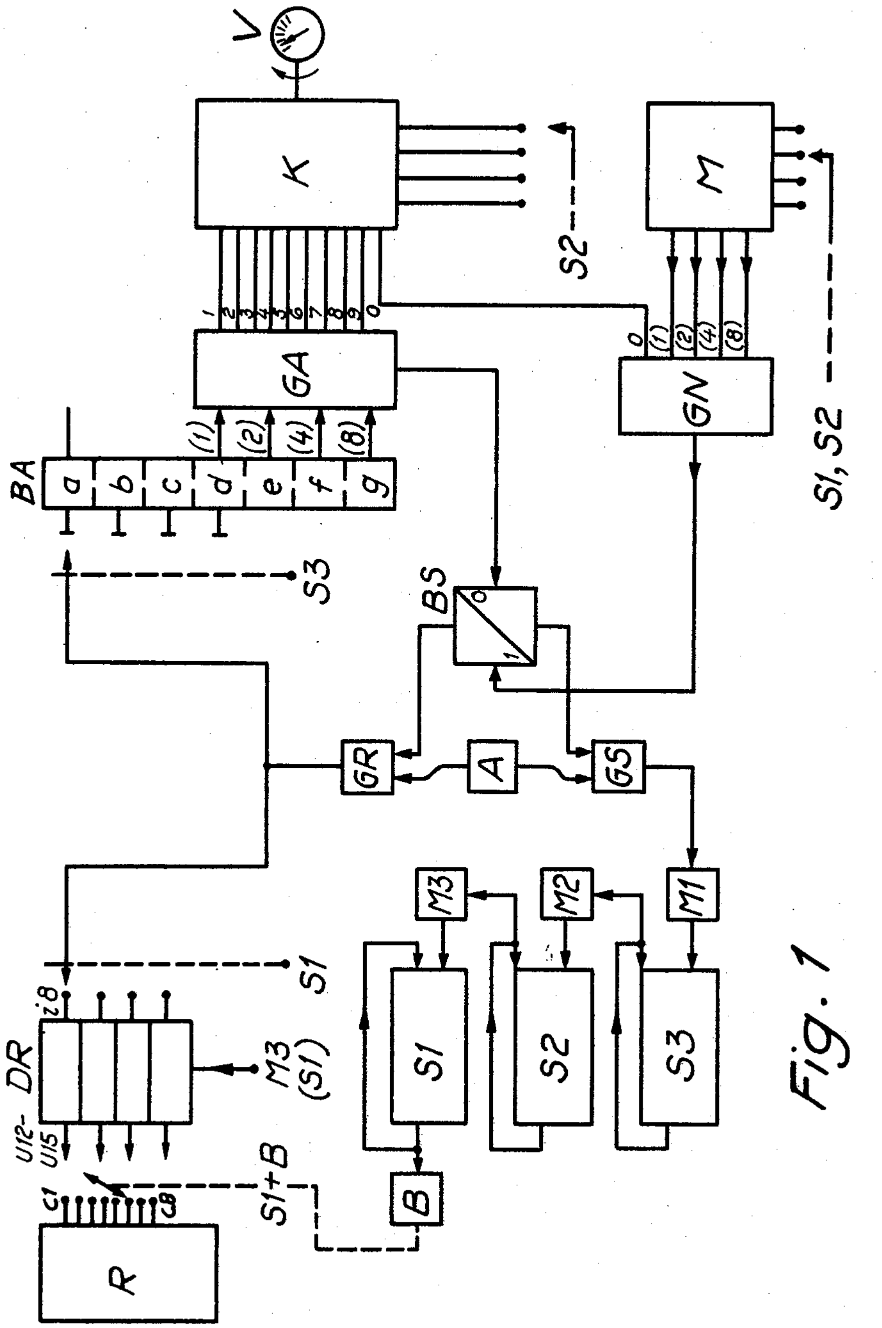
FIGURE 1 is a block diagram of a multiplying method and apparatus for carrying out the method according to the present invention.
Figure 2:
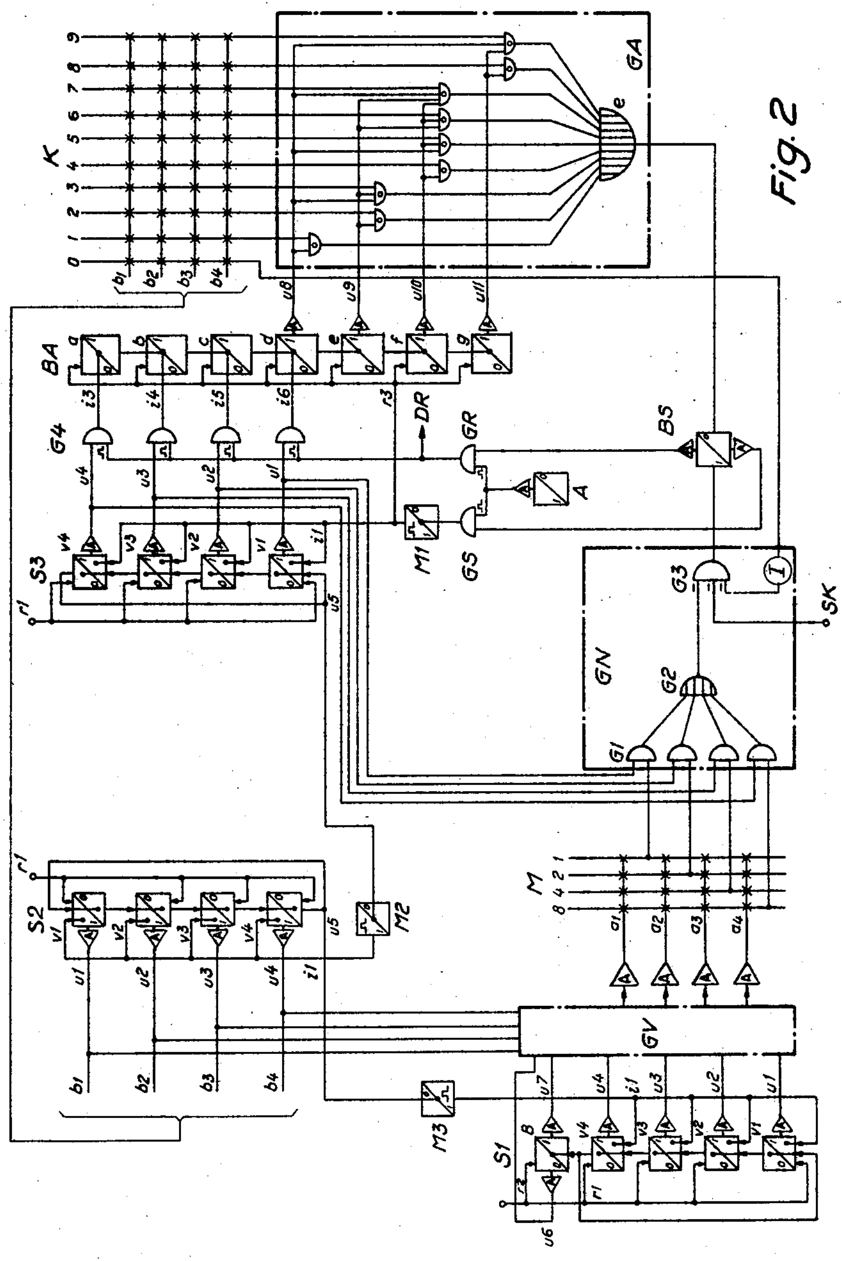
FIGURE 2 is a block diagram showing the logic circuit connections between input registers, shift registers, comparison means and counting circuits in the apparatus of the invention.

The multiplicand register M may, as illustrated in FIGS. 1 and 2, consist of an ordinary contact field comprising two groups of crossing lead wires. One group 1, 2, 4 and 8 comprises one lead wire for each position in the four order binary number representing a decimal digit in the multiplicand. The other group, labeled $a_4$, $a_3$, $a_2$, $a_1$, comprises one lead wire for each decimal digit in a four order multiplicand $a_4$, $a_3$, $a_2$, $a_1$. By connecting appropriate lead wires in the one group with appropriate leads in the other group any four order decimal number may be inserted in the register in binary coded decimal form. Any decimal digit in the multiplicand may be made available in binary coded form upon the four outputs of the register connected to gates G1 in a control means GN by applying a signal to the corresponding lead wire in the group labeled $a_4$, $a_3$, $a_2$, $a_1$. The connections between the leads in the two lead groups may be performed by any conventional suitable means, e.g. by means of a keyboard with one key for each possible connection or by means of loose connecting threads.

The other register K into which the multiplier is entered may for example, as illustrated in FIG. 2, consist of a contact field of similar type as the multiplicand register M. It comprises, however, one group of lead wires 0–9, comprising one lead wire for each digit in the decimal system, and a second group of lead wires, labeled $b_4$, $b_3$, $b_2$, $b_1$, comprising one lead wire for each digit position in a four order multiplier $b_4$, $b_3$, $b_2$, $b_1$. By connecting appropriate lead wires in the two groups with one another any for order decimal number may be inserted in the register and each decimal digit in the inserted number may be made available upon the outputs connected to a comparison means GA by applying a signal to the corresponding lead wire in the group labeled $b_4$, $b_3$, $b_2$, $b_1$. The connection between the lead wires of the two groups may also in this case be performed by means of for instance a keyboard or by any suitable means controlled by a suitable balance.

The decimal digit available upon the outputs of the multiplier register K in a given instant is by means of the comparison means GA compared with the count indicated by a seven stage binary pulse counter BA, the four highest stages *d, e, f* and *g* are connected to the comparison means. The binary counter is driven by pulses from a pulse generator A, which pulses also are applied to a decade counter DR, which serves as an accumulator.

The comparison means GA consists of nine and-gates *o* and one or-gate *e* and is shown in detail in FIGURE 2 and will be discussed below. The output of comparison means GA from or-gate *e* is connected to the naught input of bistable toggle BS which, when triggered by the signal from comparison means GA, provides an output signal for opening an and-gate GS. From FIGURES 1 and 2, it is evident that when bistable toggle BS is in its unit state, e.g. the state which is cancelled when the comparison means GA indicates coincidence between the count indicated in binary counter BA and the selected digit $b_4$, $b_3$, $b_2$, $b_1$ in multiplier register K, the pulses from the generator A will be gated through and-gate GR to be simultaneously fed to binary counter circuit BA as well as to decimal register DR. The feed point to binary counter BA is determined by the condition of shift register $S_3$ which has four possible states, depending upon the binary order of the multiplicand from register M which is selected by block GV of FIGURE 2. The feed point in decimal counter DR is also varied, but by the condition of shift register $S_1$ which also has four possible states.

Shift register $S_1$ is driven by a monostable toggle $M_3$ which is triggered by the output signal from the fourth stage of shift register $S_2$. Shift register $S_2$ is driven by monostable toggle $M_2$ which in turn is driven by the output from shift register $S_3$ and which in turn is driven by monostable toggle $M_1$ which is triggered by the output from and-gate GS and pulse generator A. The pulse generator may be a free running multivibrator adjusted to operate at a suitable frequency such as 10 kilocycles.

Figure 6:
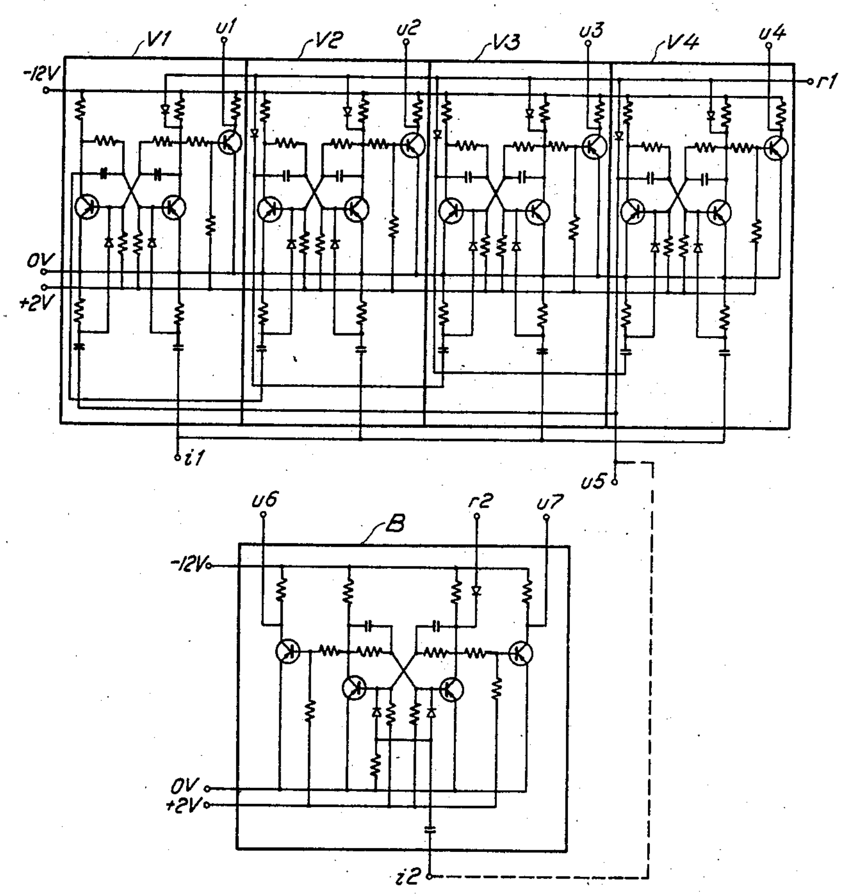
FIGURE 6 is a schematic diagram for the shift registers which are shown diagrammatically on FIGURE 2.

A suitable circuit diagram for the shift registers $S_1$, $S_2$ and $S_3$ is illustrated in detail in FIGURE 6, and in FIGURE 2 the way in which said shift registers are interconnected is illustrated. When bistable toggle BS is in its naught condition which occurs after a comparison has taken place, and-gate GS is opened and monostable toggle $M_1$ in FIGURES 1 and 2 emits pulse to shift register $S_3$. This pulse is fed to the input *i*1 of shift register $S_3$, FIGURES 2 and 6.

Each shift register consists in the illustrated embodiment of four bistable toggles $V_1$, $V_2$, $V_3$ and $V_4$ with amplifier outputs and connected in such a way that only one toggle is activated at a time. The shift register is further so connected that all toggles have a common input lead *i*1, and all the toggles are connected to a reset lead *r*1, by which the shift register is set in an initial position, in which the first toggle $V_1$ is activated. Shift registers $S_2$ and $S_3$ are provided with an output *u*5, upon which a signal consequently occurs when the shift register leaves step 4 to start through another cycle of operation.

Shift register $S_1$ comprises additionally a further toggle B which will transfer when the control means $S_1$ has stepped four steps from its initial position, e.g. is leaving step 4, and remain activated for the second cycle of the shift register $S_1$. Toggle B is provided with two amplifier outputs *u*6 and *u*7 and a reset lead *r*2. Toggle B is incorporated only in the shift register $S_1$ but not in the others.

From FIGURE 2 the connections between the three shift registers $S_1$–$S_3$ are evident. Monostable toggle $M_1$ is connected to the input *i*1 of the shift register $S_3$. When the shift register $S_3$ has gone through a cycle, e.g. stepped four steps, as a result of four pulses from the monostable toggle $M_1$, monostable toggle $M_2$ is activated from the output *u*5 of the shift register $S_3$ and its output is connected to the input *i*1 of the shift register $S_2$. When shift register $S_2$ has gone through a cycle in a similar way, requiring shift register $S_3$ to have completed three additional cycles, monostable toggle $M_3$ is activated from output terminal *u*5 and then emits a pulse to the input *i*1 of the shift register $S_1$. When shift registers $S_1$–$S_3$ simultaneously reach their highest position, e.g. when the shift register $S_1$ has gone through two cycles which are separated by the operation of toggle B, shift register $S_2$ has gone through eight cycles and shift register $S_3$ has gone through 32 cycles, the multiplication cycle is completed.

Figure 3:
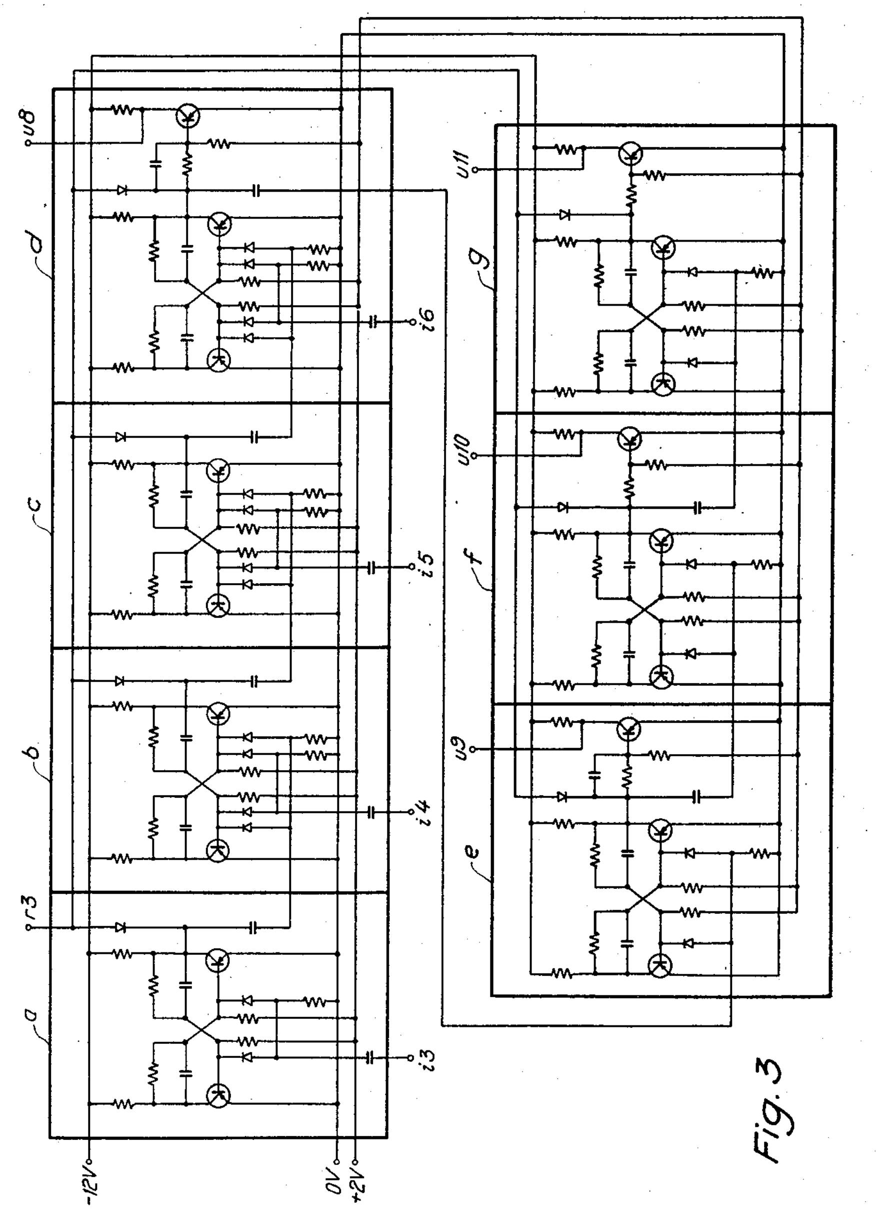
FIGURE 3 is a schematic diagram for a typical binary counter which may be used in the system of FIGURES 1 and 2.

Binary counter BA shown in detail in FIGURE 3 consists of seven toggles *a–g*, of which the four lower ones *a–d* are provided with pulse inputs *i*3, *i*4, *i*5 and *i*6 respectively. The four higher toggle stages *d–g* are provided with amplifier outputs terminals *u*8, *u*9, *u*10 and *u*11 respectively. All the toggles are connected to a reset lead *r*3 from monostable toggle $M_1$, by means of which all the toggles may be reset to their naught condition. Toggles *a–g* are so interconnected that they form a conventional binary pulse counter, i.e. putting only the toggle *d* in on-position requires either 1 pulse upon the input *i*6 of the toggle *d*, or 2 pulses on the input *i*5 of the toggle *c*, or 4 pulses on the input *i*4 of the toggle *b*, or 8 pulses on the input *i*3 of the toggle *a*; and putting the toggle *d* as well as the toggle *e* in on-position requires 3, 6, 12 or 24 pulses, respectively, on the inputs *i*6, *i*5, *i*4 and *i*3 respectively, and so on.

When necessary the outputs from the toggles in the shift registers and other registers are connected to amplifiers and such amplifiers are in the diagram indicated by the usual symbol.

Before describing the way in which the multiplication is performed and the result is conveyed to a device R for indicating the result, an embodiment of the comparison means GA and its operation will be described with reference to FIGURE 2. In the illustrated embodiment, comparison means GA has already been described as comprising nine and-gates *o* and one or-gate *e*, connected in such a way that the 1-line from the multiplier register K is compared with the output from the toggle *d* in the binary counter BA. And in the same way the 2-line is compared with the output from the toggle *e*, the 3-line with the outputs from the toggles *d* and *e*, the 4-line with the toggle *f*, the 5-line with the toggles *d* and *f*, the 6-line with the toggles *e* and *f*, the 7-line with the toggles *d, e* and *f*, the 8-line with the toggle *g* and the 9-line with the toggles *d* and *g*. The outputs of all the and-gates are connected to the or-gate in the device and the output of said or-gate is connected to the naught input of the toggle BS. Toggle BS is triggered to its naught condition as soon as any of the comparisons coincide. When coincidence is indicated, binary counter BA has then produced a number of pulses, as is determined by the digit then activated in the multiplier register K. If toggle $V_1$ in $S_3$ is energized so that pulses from and-gate GR are applied to input *i*6 of stage *d*, then the number of pulses is identically equal to the value of the decimal digit in multiplier register K. If one of the other toggles of shift register $S_3$ is energized, then the number of pulses required to produce coincidence is 2, 4 or 8 times the value of the multiplier digit in register K.

Shift register $S_2$ can have four different states, 1, 2, 3 and 4. The first $V_1$ or the second $V_2$ or the third $V_3$ or the fourth toggle $V_4$ in $S_2$ can be activated. When the first toggle $V_1$ in shift register $S_2$ is activated, the units digit $b_1$ in the multiplier in the K register is connected to the comparison means GA. When the second toggle $V_2$ is activated, the tens digit $b_2$ of the K register is applied to comparison means GA. When the third toggle $V_3$ is activated, the hundreds digit $b_3$ of the K register and when the fourth toggle $V_4$ is activated the thousands digit $b_4$ in the multiplier digit in the K register are successively applied to comparison means GA.

The selection of the particular order of the four order digit in the multiplicand register M is performed by means of selector GV, e.g. a diode matrix, which is controlled by the output signals from shift registers $S_1$ and $S_2$, and selects one of the digits in the multiplicand $a_4$, $a_3$, $a_2$, $a_1$, according to a rule determined by the manner in which the multiplication is performed.

A single multiplicand decimal digit $a_1$, for example, from register M is coded into a four order binary number and each binary order of the selected decimal digit is applied as one input to one of the and-gates G1 (see FIGURE 2). The other input to and-gates G1 is from the stages in shift register $S_3$. If the selected multiplicand decimal digit from register M is assumed to be 5 and the multiplier digit in register K is assumed to be 8, then coincidence is indicated when stage $V_1$ in register $S_3$ is active and eight pulses from and-gate GR are applied through stage *d* of binary counter BA. When a coincidence is indicated at or-gate *e*, bistable toggle BS is triggered.

Shift register $S_3$ now advances one step to position $V_2$, but because the second binary order of the assumed multiplicand digit 5 from register M is a naught, there is no output from the corresponding and-gate G1 and shift register S3 then advances to activate stage $V_3$. At this time a signal is provided from the corresponding and-gate G1 to transfer bistable toggle BS to its unit condition and open and-gate GR. The output pulses now are applied to stage *b* of binary counter BA since stage $V_3$ of shift register $S_3$ is active. It requires four times eight or 32 pulses to register coincidence from or-gate *e* and transfer bistable toggle BS. The next step of shift register $S_3$ does not cause a coincidence in and-gate G1 since the 4 binary order of the multiplicand digit 5 is a naught.

By the foregoing operation, the multiplicand digit 5 from register M has been multiplied by the multiplier digit 8 from register K to produce 40 pulses all total which have been also applied to decimal register DR (see FIGURE 1).

A diagram of the manner in which the multiplication is performed is illustrated in FIGURE 7. For each cycle of shift register $S_2$, which selects a different order of the decimal digit in the multiplier $b_4$, $b_3$, $b_2$, $b_1$, shift register $S_1$ takes one step as described above. During the first cycle of $S_2$, when consequently $S_1$ is in step 1, all decimal digits in the multiplier are multiplied with binary orders of the decimal digits in the multiplicand which give a partial product, the unit digit of which is in the unit position $c_1$ in the result, i.e. $a_1 \times b_1$ (table shown in FIGURE 7). In FIGURE 7, the four successive positions of shift register $S_2$ are illustrated vertically while the four successive positions of shift register $S_1$ are illustrated horizontally. Where two 4 order decimal digits are multiplied together, there are 8 positions $C_1$–$C_8$ in the product, $C_1$ being the unit position, $C_2$ being the tens position, $C_3$ being the hundreds position etc.

During the second cycle of $S_2$ when $S_1$ is in its number 2 position, all factors or decimal digits in the multiplier and the multiplicand are multiplied which give partial products the unit digits of which are related to the tens position $c_2$ in the result, i.e. $b_1 \times a_2$ and $b_2 \times a_1$, and so on.

During the first cycle of $S_1$, toggle B is in the 0-position and during the second cycle in the 1-position. From the diagram in FIGURE 7 it is evident that if the number pair $(p, q)$ represents the state $p$ of the shift register $S_1$ and the state $q$ of the shift register $S_2$, each of $p$ and $q$ being able to be 1–4, the selector GV of FIGURE 8 selects the lowest order digit $a_1$ in the multiplicand register M for the number pairs (1, 1), (2, 2), (3, 3) and (4, 4) corresponding to $(a_1, b_1)$, $(a_1, b_2)$, $(a_1, b_3)$ and $(a_1, b_4)$ respectively when the toggle B is in the 0-position, the tens digit $a_2$ for the number pairs (2, 1), (3, 2) and (4, 3) corresponding to $(a_2, b_1)$, $(a_2, b_2)$ and $(a_2, b_3)$ respectively with B in the 0-position and for the number (1, 4) i.e. $(a_2, b_4)$ with B in the 1-position; the hundreds digit $a_3$ for the number pairs (3, 1) i.e. $(a_3, b_1)$ and (4, 2) i.e. $(a_3, b_2)$ with B in the 0-position and for the number pairs (1, 3) i.e. $(a_3, b_3)$ and (2, 4) i.e. $(a_3, b_4)$ with B in the 1-position; and finally the thousands digit $a_4$ for the number pair (4, 1) i.e. $(a_4, b_1)$ with B in the 0-position and for the number pairs (1, 2), (2, 3) and (3, 4) corresponding to $(a_4, b_2)$ and $(a_4, b_4)$ respectively with B in the 1-position.

Figure 8:
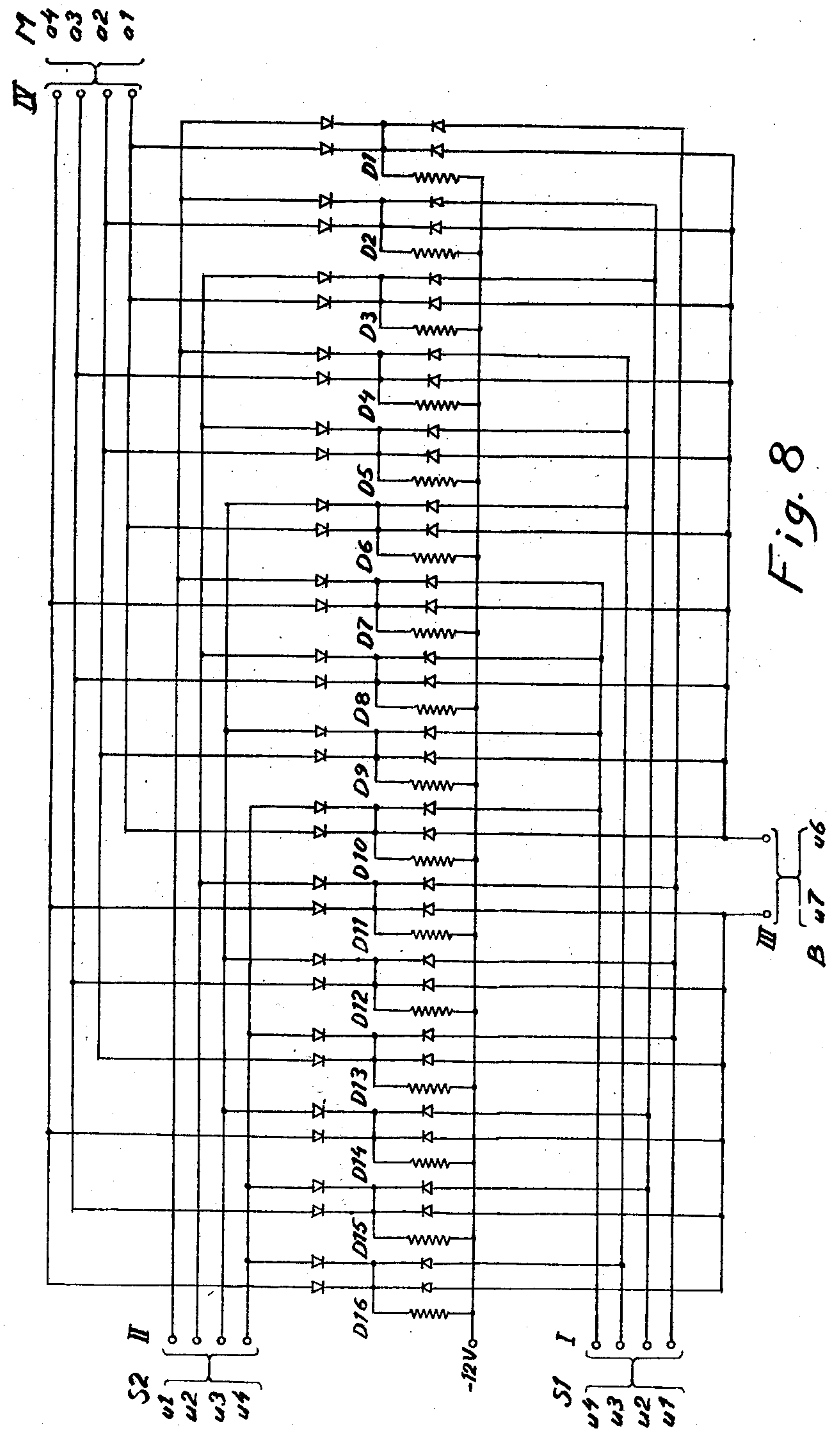
FIGURE 8 is a diagram of diode gate GV shown in FIGURE 2 for selecting decade in the multiplicand.

FIG. 8 shows the circuit diagram of a suitable diode matrix GV. This comprises sixteen diode circuits D1–D16. Each diode circuit comprises four diodes, one connected to one of the input terminals I, a second connected to one of the input terminals II, a third connected to one of the input terminals III and the fourth being connected to one of the output terminals IV. The input terminals I are, as illustrated, connected to the outputs *u1*–*u4* of the shift register $S_1$, whereas the input terminals II are connected to the outputs *u1*–*u4* of the shift register $S_2$ and the input terminals III to the outputs *u6*, *u7* of the toggle B. The output terminals IV are connected to the lead wire group labeled $a_4$, $a_3$, $a_2$, $a_1$ in the multiplicand register M. If in a diode circuit D1–D16 all three diodes, which are connected to any one of the input terminals I, II and III, receive a signal from the corresponding outputs in the shift register $S_1$ and $S_2$ and the toggle B a corresponding signal will be transmitted by the diode circuit to the output terminal IV, to which it is connected. Each diode circuit D1–D16 represents one of the number pairs mentioned above and is connected to the input terminals I, II and III and the output terminals IV accordingly.

A multiplication takes place in the following way:

(1) Under control by the shift register $S_2$ a decimal digit $b_4$, $b_3$, $b_2$ or $b_1$ is fed to the comparison means GA from the multiplier register K.
(2) By means of the shift registers $S_1$ and $S_2$ a multiplicand digit $a_4$, $a_3$, $a_2$ or $a_1$ is selected in the multiplicand register M by selector circuit GV according to the combinations given above;
(3) By means of the shift register $S_3$, a binary position is selected from the digit in the multiplicand which has been selected in the way described above;
(4) If neither the selected binary position of the multiplicand digit nor the multiplier digit is naught, pulses from the astable device A are gated through and-gate GR and the apparatus makes a comparison; the way of making a comparison has been already described.

The check that neither the binary position selected by $S_3$ in the multiplicand digit $a_4$, $a_3$, $a_2$ or $a_1$ selected by $S_1$ and $S_2$ nor the multiplier digit selected by $S_2$ is naught is performed by the zero detector GN. This comprises four and-gates G1, one for each binary position in the multiplicand register M which are connected to the corresponding toggles $V_1$–$V_4$ in shift register $S_3$. The outputs from the and-gates G1 are connected to an or-gate G2, the output of which is connected to one of the inputs of an and-gate G3, which controls the toggle BS. Inputs to and-gate G3 also include through an inverter I the 0-lead from the multiplier register K and a sequence control lead from terminal SK.

If the binary position in the multiplicand register M corresponding to the activated toggle in $S_3$ is not naught, a signal is obtained through the corresponding and-gate G1 and the or-gate G2 for one of the inputs to the gate G3. If simultaneously the selected multiplier digit in K is not zero—and if the sequence control signal from SK is in agreement—signals also occur on the two other inputs of the gate G3. The output from G3 then switches the toggle BS into the 1-position, due to which the gate GR is opened and transfers pulses from the astable toggle A to the gates G4, which are controlled by the shift register $S_3$.

If either the multiplier digit or the selected binary position in the multiplicand register M is naught, however, no signal is obtained from the output of the gate G3 and the toggle BS remains in the 0-position which it has taken after the preceding comparison in GA. In this latter case consequently no comparison will take place. The toggle BS will instead keep the gate GS open, which transfers the pulses from the pulse generator A to the monostable toggle $M_1$. This emits consequently a pulse to the control means $S_3$, which steps to the next binary position in the multiplicand register M.

(5) During the time the comparison in GA takes place the astable toggle A emits pulses with a pulse repetition frequency of for example 10 kc. These pulses from the and-gate GR are fed by means of the gates G4 to one of the four inputs *a–d* of the binary counter BA as determined by shift register $S_3$.

(6) If consequently the shift register $S_3$ has selected the 1-bit position in the multiplicand register, i.e. the toggle $V_1$ in $S_3$ is activated, it permits the feeding of pulses to toggle *d* in the binary counter; and if the 2-bit position in shift register $S_2$ has been selected, the pulses are fed to the input of the toggle *c* and so on;

(7) A displacement of one step upwards of the feed point in the binary counter BA is equivalent with a multiplication by a power of two of the number of pulses which are necessary to get coincidence between the positions *d–g* in the binary counter BA and the selected multiplier digit. A multiplication may thus take place of the four binary orders of a single multiplicand digit and the multiplier digit as described above.

(8) All the four binary positions in the multiplicand register are treated before a new multiplier digit is selected by the shift register $S_2$ in the way described in connection with the description of the shift registers;

(9) After each treatment of a single one of digits $b_4$, $b_3$, $b_2$, $b_1$ in the multiplier, the BA-counter must be reset to zero. A resetting to zero takes place between each comparison, for example as by means of a pulse from monostable toggle $M_1$, as shown in FIGURE 2.

This multiplication by two in the binary system, i.e. a multiplication by moving the "binary point" one step to the right, is fully analogous to a multiplication by a power of ten in the decimal system by moving the "decimal point" one step to the right. The number of pulses fed directly from the gate GR to the decimal counter DR will consequently for each comparison between a multiplier digit and a selected binary position in a multiplicand digit correspond directly in decimal form to the product of the multiplier digit and the selected four order binary digit as explained above.

Figure 4:
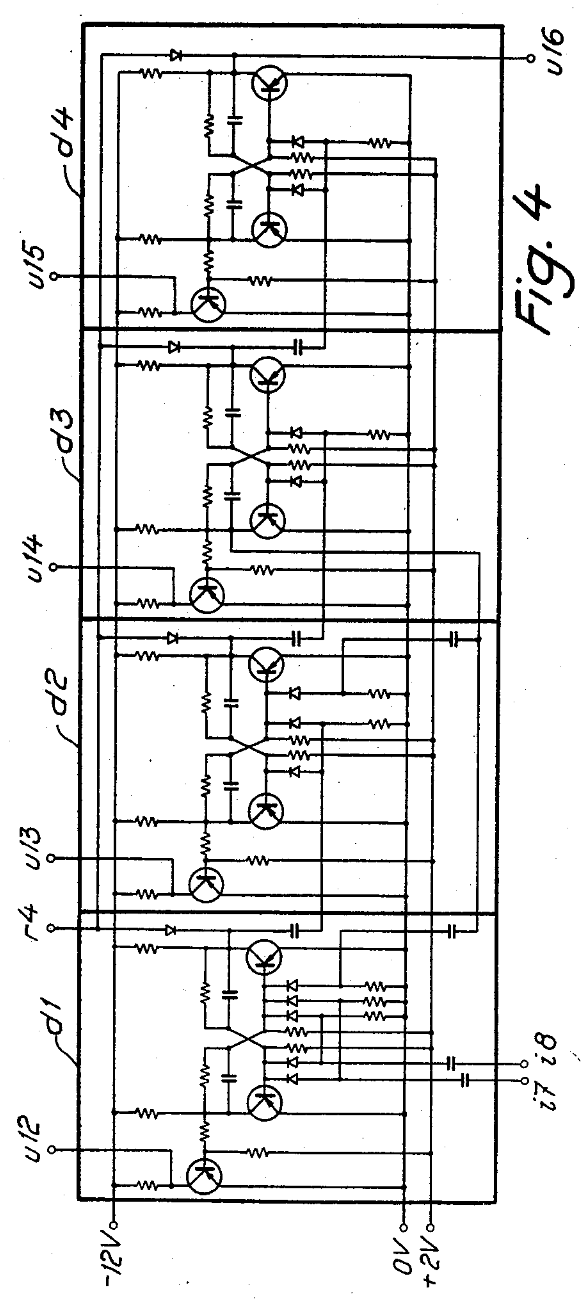
FIGURE 4 is a schematic diagram for a decimal counter which may be used in the apparatus of FIGURES 1 and 2.
Figure 5:
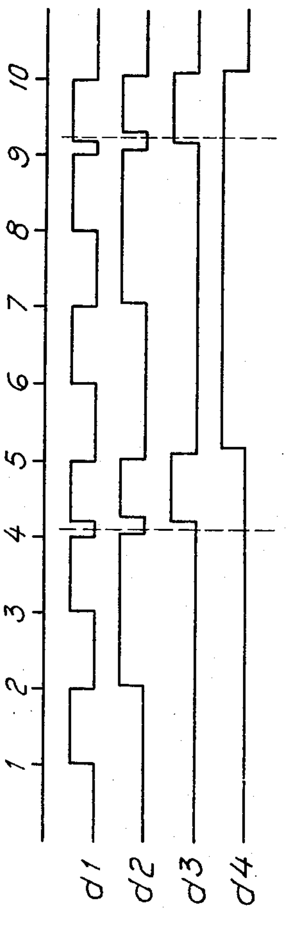
FIGURE 5 is a pulse diagram illustrating operation of the decimal counter of FIGURE 4.

The decimal counter consists of four units, each of which has the circuit diagram shown in FIGURE 4. Each decimal counter unit consists consequently of four toggles *d1–d4* with amplifier outputs *u12–u15* and a common pulse input *i8*. All the toggles are further connected to a reset lead *r4*, by means of which all the four toggles may be put in off-position. The toggles are interconnected in such a way that their states vary according to the diagram in FIGURE 5 when a pulse train is applied to the input *i8*. A signal upon the output *u12* of the toggle *d1* indicates consequently one conveyed pulse, a signal upon the output *u13* of the toggle *d2* two conveyed pulses, a signal upon the output *u14* of the toggle *d3* indicates one conveyed pulse, and a signal upon the output *u15* of the toggle *d4* five conveyed pulses. Signals upon for instance the output *u12* as well as the output *u15* indicates consequently six pulses conveyed to the input *i3*, and so on. The toggle *d4* is also provided with an output *u16* for tens cary to the next following unit in the decimal counter and the toggle *d1* is provided with an input *i7* for tens carry from the preceding unit in the decimal counter.

Which of the four units in the decimal counter DR that is to receive the pulses from the gate GR at any moment is determined by the shift register $S_1$ in exactly the same way as the shift register $S_3$ selects feed-in point to the binary counter BA. The outputs *u1–u4* from the shift register $S_1$ are consequently connected to each one gate, corresponding to the gates G4 for the shift register $S_3$, and these gates receive also the pulses from the gate GR and are with their outputs connected to each one of the four units in the decimal counter DR. Consequently a new unit in the decimal counter DR is selected as feed-in point for the pulses from GR each time the shift register $S_1$ takes a step, i.e. each time a new digit position $C_1$ through $C_8$ is started in the result. Thus, in the first digit position $C_1$ when shift register $S_1$ is selected, the only partial product produced as the result of one cycle of shift register $S_2$ is $a_1b_1$. In the second or tens digit position $C_2$ when shift register $S_2$ is selected and the feed-in point has shifted to the second unit in the decimal counter DR, the partial products $a_2b_1$ and $a_1b_2$ are produced.

As the feed-in point in the decimal counter DR is varied with the advance of shift register $S_1$, the transmission of the digit in the selected unit from the decimal register DR to, for example, a totalizing device R for indicating the result takes place. This transmission from the four units of the decimal counter takes place with a delay of one step of shift register $S_1$ so that the final transmission of the units digit takes place concurently with the determination of the value of the tens digit. Thus, any carry from the lower order is completed prior to the final transfer from the digit. Toggle B comes into the transmission logic to separate the four first positions $C_1$—$C_4$ and the four last positions $C_5$–$C_8$ in the result, which in this case has eight positions. As each unit of decimal counter is used twice during the multiplication, it must be reset immediately after being read-out to be available to receive a cary from a lower order unit.

The described multiplying apparatus can naturally be made for any number of digits in the multiplicand and the multiplier, but the number of toggles in the shift registers $S_2$ and $S_1$ must be chosen accordingly.

The sequence control SK checks in the usual way that the toggles and similar devices are in their pedetermined positions when the multiplication begins.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. Apparatus for the multiplication of two decimal numbers comprising: means for converting and storing one of said numbers into a multi-order binary coded decimal; a binary counter having output terminals connected as one input to a logical matrix; means connecting the other of said numbers in decimal form to said matrix; an output gate circuit for indicating coincidence when the value in the counter circuit is equal to said other number;

a pulse generator; means including a shift register and gating circuits connected to said storage means for supplying pulses from said pulse generator to said counter circuit to produce coincidence individually for each order of the binary coded decimal; means responsive to a coincidence indication from said output gate circuit for doubling the number of input pulses to said counter circuit required to advance the count of said counter circuit as each higher order of said binary coded decimal is connected to control pulses supplied to said binary counter; and a decimal counter for totalizing the number of pulses required for causing coincidence indication for each order of said binary coded decimal.

2. Apparatus as defined in claim 4 wherein the binary coded decimal comprises four orders; wherein said shift register comprises four stages; said binary counter comprises seven stages, with the output terminals connected from the highest four stages; and wherein said coincidence indication responsive means control said shift register to select the four orders of said binary coded decimal lowest order first and to feed the pulses to said binary counter at progressively lower orders in the counter beginning with the fourth order.

3. Apparatus as defined in claim 1 wherein one of said decimal numbers is a plural order number and said decimal counter is composed of a plurality of units, one for each order and each having a feed point; and further comprising a second shift register for selecting the separate orders of said plural order number and the feed point in said decimal counter in accordance with the position of the partial product digit of two digit orders being multiplied in the final product number.

4. Apparatus as defined in claim 1 wherein both decimal numbers are plural order numbers and said decimal counter is composed of a plurality of units, one for each order and each having a feed point; and further comprising second and third shift registers; a gating matrix connected to said second and third shift registers for correlating selection of separate digits of said two decimal numbers with the various feed points in decimal counter in accordance with the position of the partial product digit of the two digits being multiplied in the final product number.

5. Apparatus as defined in claim 4 wherein the decimal counter comprises only four units corresponding to four orders to produce only a partial result; and further comprising a resultant decimal indicating device having a plurality of input terminals greater than four; and means for sequentially connecting the output signals from the units of said decimal counter to successively higher order inputs of said indicating device as the multiplication operation proceeds.

6. Apparatus as defined in claim 4 wherein said three shift registers are connected in tandem so that the first mentioned shift register cycles once for each change in said second shift register, and said second shift register cycles once for each change in said third shift register; and means for activating said shift registers by a monostable circuit connected to the input of the first mentioned shift register.

7. Apparatus as defined in claim 6 further comprising a pair of and-gate circuits connected to the output pulses of said pulse generator; means including a bistable circuit controlling said pair of and-gate circuits for connecting the pulses from said pulse generator to both said decimal counter and said binary counter through one of said and-gate circuits and for connecting the output pulses from said pulse generator to said monostable circuit through the other of said pair of and-gate circuits.

8. Apparatus as defined in claim 7 further containing a circuit for detecting a zero in either of the digit values to be multiplied; means connecting a signal from the output gate indicating coincidence as one input to said bistable circuit to open the other of said pair of and-gate circuits; and means connecting a signal from said zero detecting circuit when the presence of no zero is detected as another input to said bistable circuit to open said one of said pair of and-gates.

9. Apparatus as defined in claim 8 wherein said zero detecting circuit comprises four input gates having input leads connected to respective stages in the first mentioned shift register and to corresponding orders of said binary coded decimal; an intermediate or-gate connected to the outputs of said four input gates; and an output gate having its output connected to said bistable circuit and the output from said or-gate and the zero lead in said logical matrix as inputs.

10. In apparatus for multiplication of two plural digit decimal numbers, one being a multiplier and one being a multiplicand, a first register means for storing said multiplier in decimal form; a second register means for storing said multiplicand in binary coded decimal form; selecting means for simultaneously selecting a decimal multiplier digit in said first register means and a binary coded decimal multiplicand digit in said second register means in every possible combination of digit pairs; pulse generating means for generating a number of pulses for each binary "1" digit in the binary coded decimal multiplicand digit of each selected digit pair; means for dividing said number of pulses by a power of two corresponding to the order position of said binary "1" digit in said binary coded decimal multiplicand digit; means for converting said divided number of pulses into a binary digit; means for comparing said last mentioned binary digit with the decimal multiplier digit in the corresponding digit pair and for stopping said pulse generating means upon coincidence; a decimal pulse counter having a plurality of units corresponding to the different digit positions in the product result of the multiplier and the multiplicand and having a feed-in location for each unit; and means for supplying all pulses produced by said pulse generating means for each selected digit pair to the feed-in location of one and the same unit in said decimal counter as determined by the order positions of the digits of the selected digit pair in the multiplier and the multiplicand.

11. Apparatus as defined in claim 10, wherein the digit order of the multiplier may be represented as $p$ and the digit number of the multiplicand may be represented as $q$, and further comprising means for programming said apparatus to select digit pairs in the sequence including means for first selecting the two lowest order digits, for which $p$ is 1 and $q$ is 1 and the sum of $p$ and $q$ is 2, and means responsive to said first selecting means for supplying pulses produced for this first digit pair to the feed-in location of the lowest order unit of the decimal counter; means for next selecting all digit pairs, for which the sum of $p$ and $q$ is 3, and means responsive to said next selecting means for supplying pulses produced for these digit pairs to the feed-in location of the next higher order unit of the decimal counter; and means for successively selecting all digit pairs, for which the sum of $p$ and $q$ is 4, then 5, then 6 . . . then $n$, and means responsive to each digit pair selecting means for supplying pulses produced for these digit pairs to the feed-in locations of the decimal counter at successively higher order units as determined by the sum of $p$ and $q$ for each digit pair.

References Cited in the file of this patent

UNITED STATES PATENTS 2,913,178 Petherich, et al. ________ Nov. 17, 1959

UNITED STATES PATENT OFFICE

CERTIFICATE OF CORRECTION

Patent No. 3,120,604 February 4, 1964

Bror Gustav Valdemar Pettersson

It is hereby certified that error appears in the above numbered patent requiring correction and that the said Letters Patent should read as corrected below.

Column 8, lines 10 and 49, for "cary", each occurrence, read -- carry --; column 9, line 14, for the claim reference numeral "4" read -- 1 --.

Signed and sealed this 7th day of July 1964.

(SEAL)
Attest:

ERNEST W. SWIDER
Attesting Officer

EDWARD J. BRENNER
Commissioner of Patents